B. D. COOK.
Grain-Drill.

No. 55,470. Patented June 12, 1866

Witnesses:
Elisha H Cook
George Johnson

Inventor:
Byron D Cook

UNITED STATES PATENT OFFICE.

BYRON D. COOK, OF CLARENDON TOWNSHIP, CALHOUN COUNTY, MICHIGAN.

IMPROVEMENT IN SEEDING-MACHINES.

Specification forming part of Letters Patent No. 55,470, dated June 12, 1866.

*To all whom it may concern:*

Be it known that I, BYRON D. COOK, of the township of Clarendon, in the county of Calhoun and State of Michigan, have invented certain new and useful Improvements in Machines for Sowing Seeds and Fertilizing Agents, and especially for sowing clover and other grass-seeds, with ground plaster or gypsum; and I do hereby declare that the following is a full, clear, and exact description of the construction and operation of the same, reference being had to the annexed drawings, making a part of this specification, in which—

Figure 1:
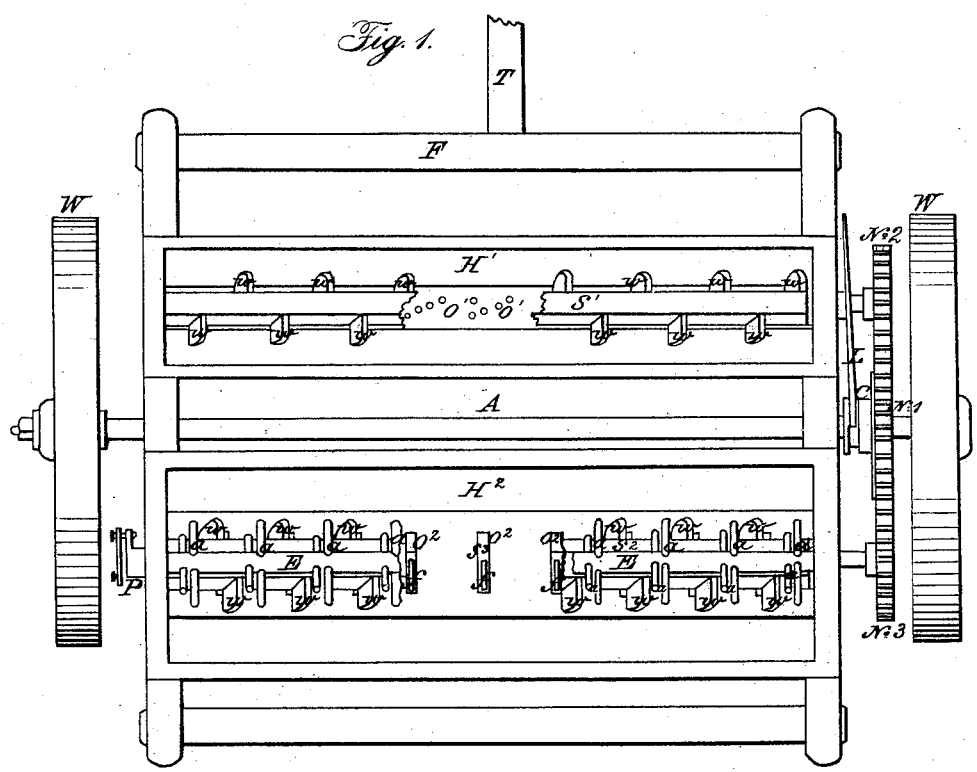
Figure 2:
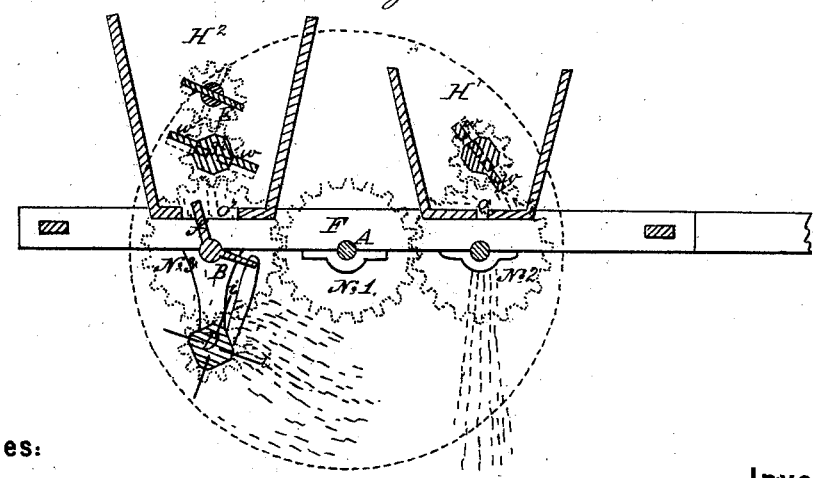

Figure 1 is a plan view. Fig. 2 is a partial side elevation and vertical longitudinal section.

Similar letters of reference indicate like parts in both of the figures.

The nature and object of my invention are to insure a more perfectly uniform and uninterrupted flow of seed and of fertilizing matter than has hitherto been effected by machines of this class; and it consists in the use of what I term "converging scrapers," in connection with a revolving agitator, vibrating clearer, and distributing-roller; and the better to enable others skilled in the art to construct and use my invention, I will now proceed to describe it.

A wooden rectangular frame, F, provided with a tongue, (represented at T broken off,) to which the draft animals are hitched, is supported upon wheels W, which are hung, one fast and the other loose, upon the axle A. One hopper, H', of the ordinary size and form, to contain the seed to be sown, and another, H², of similar form and proportionate size, to contain the powdered gypsum or other fertilizer, are attached a suitable distance apart transversely to the frame. A shaft, S', usually of wood, fitted at each end with a band and gudgeon, is hung inside of each hopper in bearings formed in the ends, said shaft being provided on two opposite sides with rows of projecting wings (marked $w$) of hard wood or sheet metal properly secured to it at or about an angle of seventy degrees at equal corresponding distances apart, with the apertures in the bottoms of their respective hoppers, as seen at $o'$ $o^2$, the shafts, &c., being represented as having portions broken out to exhibit the positions of such wings relatively with the said apertures.

It will be seen that these wings are not arranged spirally on the shaft, but in the same direction, and that they are so placed relatively with the discharge-apertures that when they revolve one set will scrape the seed or fertilizing material from the right-hand side of the said apertures, and the opposite set from the left toward their centers.

The good effect of plaster as a fertilizer is much impaired when from its tendency to consolidate, especially in damp weather, it is scattered unevenly in a lumpy state over the ground. By the use of my arrangement, to be explained presently, I insure a free uniform discharge and a proper distribution of the plaster in a pulverized state.

In the hopper to contain the plaster, and immediately above the converging scrapers aforesaid, I hang what I term an "agitator," E, which consists simply of a shaft provided with radial teeth or arms $a$, which revolve, when at work, between the scraper-wings below and keep the plaster loose and friable; and to prevent the oblong discharge-apertures $o^2$ from clogging I employ a vibrating shaft, $S^3$, having fingers $f$ attached, which project upward through the said apertures, and by their vibratory action back and forth not only keep the passages free, but aid materially in delivering the plaster in a perfectly pulverized condition on the distributer D, immediately below, which consists of a shaft provided with wings $i$, running longitudinally, upon which the plaster falls, and is scattered by their rapid rotation evenly over the ground. It is not essential, however, that the distributer-wings should be continuous in length, as flat projecting arms, if sufficiently near together, will perform substantially the same duty.

The distributer is hung in bearings formed in brackets B, attached to the frame, which brackets also furnish the whole or half bearings for the journals of the vibrating clearers $f$.

Motion is communicated to the several principal parts just described by a train of spur-wheels and pinions arranged as clearly shown by the dotted lines in Fig. 2, consisting of the driver No. 1, which is fitted loose on the main axle A, and can be locked or unlocked with it at pleasure by means of a lever, L, operating a sliding clutch, C, in the ordinary way. Wheels Nos. 2 and 3 are intermediates to communicate motion to pinions on the revolving scrapers, agitator, and distributer, and which require no special reference or description. The intermediate No. 2 is hung loose upon a stud projecting from the frame, and No. 3 revolves freely upon the overhang of the vibrating clearer-shaft, and give motion to the two shafts above and the distributer-shaft below, which shaft is furnished at its ungeared end with a short crank, P, connected with a rocking arm, R, on the said vibrating shaft, and communicates to its fingers a rocking or vibratory travel within the discharge-outlets, as aforesaid.

A cover (not shown) is usually hinged to the seed-hopper, upon which the driver sits, and the hopper-bottoms are furnished with perforated sliding gage-plates in the usual way.

The hoppers being properly gaged and filled, the driver, mounting his seat, takes hold of the lever L, which is within easy reach, locks wheel No. 1 with the main axle, and starts his team in motion. As No. 1 now turns with the axle it communicates through the intermediates Nos. 2 and 3 a simultaneous rotating and vibrating motion to the several parts in gear, in the manner and with the effect heretofore described.

I do not claim, broadly, agitating or stirring the contents of the hoppers by means of revolving arms, for that is old; nor do I claim irrespective of peculiar arrangement, by which a new effect is produced, the scraping, moving, or conveying such contents by the operation of wings set angularly on a revolving shaft. I know also that distributers substantially the same as mine have been extensively used heretofore, and for a similar purpose; but I am not aware that any such have ever been operated in connection with a vibrating clearer like mine and in the manner herein described by me; but, Having explained my invention, what I claim as new, and desire to secure by Letters Patent, is—

1. The arrangement of the converging wings $w$ upon the shafts $S'$ $S^2$ in such manner as to scrape seed or fertilizing material from each side and toward the center of their respective discharge-apertures $o'$ $o^2$, substantially as herein set forth.

2. The employment of the converging wings $w$, in combination with the revolving agitator E, the vibrating clearing-fingers $f$, and the distributer D, arranged and operated relatively with each other and with the rest of the machine substantially in the manner and for the purposes herein described.

BYRON D. COOK.

Witnesses:
ELISHA H. COOK,
GEORGE JOHNSON.